United States Patent
Ayestaran

(10) Patent No.: US 6,703,140 B2
(45) Date of Patent: *Mar. 9, 2004

(54) SANDWICH TYPE BOARD

(75) Inventor: Javier Ayestaran, Legorreta (ES)

(73) Assignee: Prodema, S.A. (ES)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/359,841

(22) Filed: Jul. 23, 1999

(65) Prior Publication Data

US 2003/0129430 A1 Jul. 10, 2003

(51) Int. Cl.[7] .................. B32B 27/04; B32B 29/00; B32B 27/42
(52) U.S. Cl. ............... 428/503; 428/501; 428/502; 428/506; 428/507; 428/511; 428/528; 428/530; 428/534; 428/535; 428/537.1; 428/537.5
(58) Field of Search ................... 428/500, 534, 428/535, 536, 537.1, 537.5, 506, 507, 511, 526, 530, 501, 502, 503, 528

(56) References Cited

U.S. PATENT DOCUMENTS

| | | | | |
|---|---|---|---|---|
| 3,345,248 A | * | 10/1967 | Pounds et al. | 428/503 |
| 3,589,974 A | * | 6/1971 | Albrinck et al. | 428/460 |
| 3,975,572 A | * | 8/1976 | Power | 428/452 |
| 4,789,604 A | * | 12/1988 | van der Hoeven | 428/503 |

FOREIGN PATENT DOCUMENTS

GB 2307882 A * 5/1997

* cited by examiner

Primary Examiner—Monique R. Jackson
(74) Attorney, Agent, or Firm—Muserlian, Lucas and Mercanti

(57) ABSTRACT

Sandwich type board, for application in the construction field, of the type comprised of side and counterside, which has the following successive layers, from the center to the outside: a cellulose core impregnated in phenolic resin, a cellulose film impregnated in melamine, a laminated wood panel treated with phenolic resin, a tone package of one to three translucent and/or transparent films of cellulose, each of them impregnated in a resin to be chosen between melamine, melamine-acrylic, phenolic, melamine-phenolic, a multi-layer transparent/translucent acrylic film and a surface finish obtained by means of a demoulding film in the board press process.

5 Claims, 1 Drawing Sheet

SANDWICH TYPE BOARD

BACKGROUND OF THE INVENTION

Sandwich type boards for outdoor use are already well known. These boards are made of different layers of wood and cellulose material with impregnations, which are then pressed to form a compact board.

These well-known boards have disadvantages, namely:

Physical-chemical contamination of the different layers of the board impregnated in different resins.

Little chromatic adaptability to the requirements of the different customers.

Little surface finish adaptability in the final presentation of the board.

Low resistance to environmental physical-chemical conditions, for example, ultraviolet rays.

A package of cellulose sheets impregnated in phenolic resin is usually used as the core for these boards. Over this, and on each side, a thin panel, for example 0.5 mm., of wood is fitted, also impregnated in phenolic resin. The rougher and darker pigmentation of the core easily passes to the wood panel, contaminating it and modifying its outer aspect.

To avoid this, a cellulose film, impregnated in melamine, is placed between the core and the wood panel, acting as a physical-chemical barrier.

SUMMARY OF THE INVENTION

The durability, functionality and aspect of these boards depend on the number of layers of different materials used and the type of impregnation resin, so there are infinite combinations and only a few of them give practical results, one of which being the combination targeted by this invention.

The surface resistance to the sun's radiation, mainly to ultraviolet rays (UV rays), is achieved by providing the outside of the sandwich with an acrylic type film, but in laboratory practice, the applicant has observed that a sandwich-board with just an acrylic film on the outside does not pass the boiling immersion test for two hours, giving rise to bubbles and deformation.

The applicant has also overcome this obstacle by converting the acrylic film into a multi-layer film comprised of an acrylic type transparent/translucent film and an absorbent cellulose film, which will also be transparent/translucent when impregnated with a resin of the same nature as that used to impregnate the previous layer of the sandwich. Both films are joined together with an adhesive.

DESCRIPTION OF THE SEVERAL VIEWS OF THE DRAWINGS

To understand the object of this intervention better, a preferential form of practical execution is shown on the drawings, which is subject to incidental changes that will not detract from the foundation.

Below an example of a practical execution of this invention is described, which is not restrictive.

The board has side ($C_1$) and counterside ($C_2$).

In the invention, any sandwich board for outdoor use must have an acrylic type outer film (5) on the outside.

DETAILED DESCRIPTION OF THE INVENTION

Figure 1:
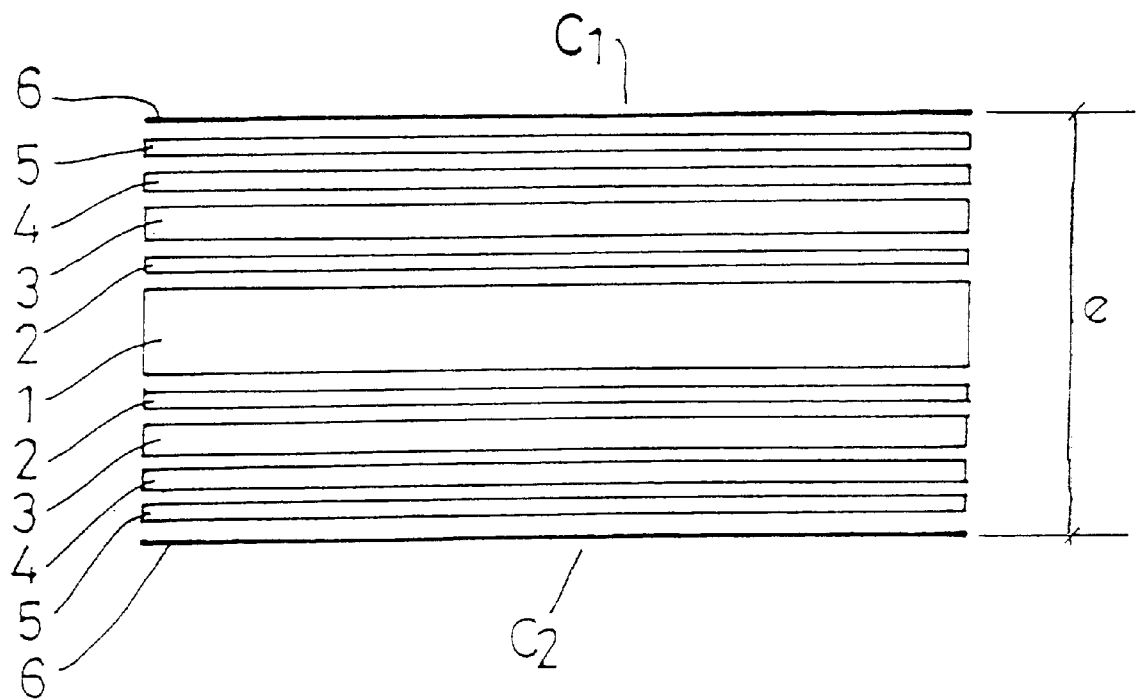
FIG. 1 is a schematic section with the different layers comprising the board targeted by the invention.
Figure 2:
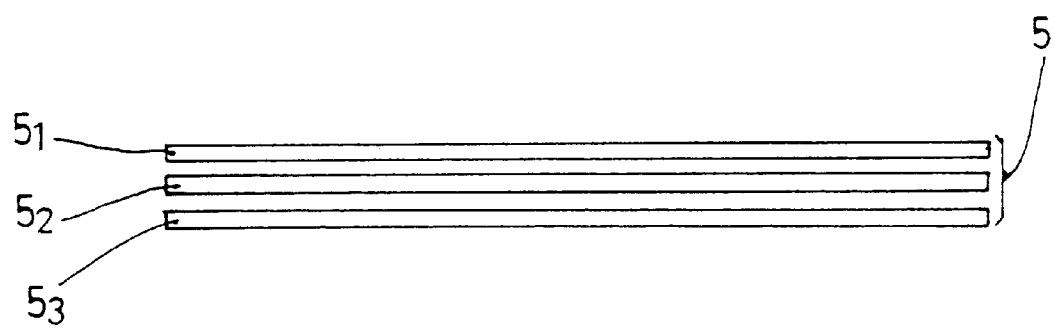
FIG. 2 is a schematic section of the acrylic layer-film (5).

The last or outside film (5)—FIG. 2—is a transparent/translucent multi-layer film (because its components are transparent/translucent), comprised of an acrylic type outer film ($5_1$), an adhesive ($5_2$), for example with polyurethane base, acrylic base, polychloroprenes, etc., and an absorbent cellulose film ($5_3$), impregnated in a resin of the same nature or compatible with the resin used to impregnate the layer immediately below it. In the case of FIG. 1 it would be the tone package (4).

For example if a phenolic resin has been used in the tone package (4) as impregnation, the absorbent cellulose film ($5_3$) will be impregnated in phenolic resin.

A series of packages (called Kraft) made of absorbent cellulose sheets impregnated in phenolic resin are placed as a core (1).

In principle, the board is symmetrical, so only one of the sides will be described, but part of the object of the invention is that some elements may not be fitted if they are unnecessary, for example in the counterside ($C_2$).

A thin wood panel (3) is placed on the core (1) and impregnated in phenolic resin, for example with 0.8 mm.

If this arrangement were to be left as such, it would give rise to a physical-chemical interchange between the wood panel (3) and the core (1); for example pigments from the core (1) to the wood (3), which may damage the nature of the wood, even causing a chromatic change in tone and stains, which would make it fail as the surface can be seen from the outside.

To avoid this, a cellulose film, impregnated in melamine (2), is placed between the core and the wood panel, acting as a physical-chemical barrier.

A tone package (4) comprised of films is placed on the wooden panel (3). This package varies according to needs and can have one to three cellulose films, each of them impregnated in one of the following resins: melamine, melamine-acrylic, phenol or melamine-phenol. Normally each of the films of this package (4) are transparent or translucent, and may have silica and pigment-extenders, thus achieving different tones and abrasive resistance.

The last transparent acrylic film (5) is for greater security in the physical-chemical resistance properties to environmental conditions, for example ultraviolet rays.

As the surface aspect of these boards is also very important, a demoulding film (6) is placed over the last film (5) during the board pressing process. This is not incorporated into the structure of the board but gives it surface finish. The demoulding film (6) can be different for the side ($C_1$) and the counterside ($C_2$).

For the demoulding film (6) a choice can be made between matte silicone, polypropylene or gloss silicone, to achieve a matte, a satin or a crystal gloss finish, respectively.

The final board is compact and around 10 mm thick (e).

It is understood that the acrylic type multi-layer film (5) can be used with the board described for FIG. 1, or other sandwich boards, for example that only have core (1) and wood panels (3), or core (1) and tone packages (4).

EXAMPLE I

The core is a 180/290 gr./sq.m phenolic Kraft with the relative melamine sheet (2).

The wooden panels (3) measure 0.75–0.80 mm. thick.

The tone package (4) is comprised of an inner cellulose film impregnated in dark tone phenolic resin, and an outer cellulose film impregnated in melamine and with a silica-extender.

The transparent acrylic outer film (5) with <2% transmittance at wave length 290–370 mm. with 1.13 gr/cm³ density.

A crystal gloss siliconed film is used for the demoulding for both sides ($C_1$), $C_2$).

The result is a board that measures approximately 2440×1220×8 mm. whose sides are both the same, smooth, with gloss and dark tone.

EXAMPLE II

The core is a 180/290 gr./sq.m phenolic Kraft with the relative melamine sheet (2).

The wooden panels (3) measure 0.75–0.80 mm. thick.

The tone package (4) is comprised of an inner cellulose film impregnated in light tone phenolic resin, and an outer cellulose film impregnated in melamine and with a silica-extender.

The transparent acrylic outer film (5) with <2% transmittance at wave length 290–370 mm. with 1.13 gr/cm³ density.

A polypropylene film is used for the demoulding for both sides ($C_1$), $C_2$).

The result is a board that measures approximately 2440×1220×8 mm. whose sides are both the same, smooth, satin-finish and light tone.

What is claimed is:

1. A sandwich board comprising:
   (c) successive layers, said successive layers comprising:
      (v) a core comprised of packages of absorbent cellulose sheets impregnated with phenolic rsin,
      (vi) a cellulose film impregnated with melamine outside said core;
      (vii) a wood panel treated with phenolic resin outside said cellulose film;
      (viii) a tone package of one to three translucent and/or transparent films of cellulose each of which is impregnated with a resin selected from the group consisting of melamine, melamine-acrylic, phenolic and melamine-phenolic; and
   (d) a protective multi-layer transparent/translucent film placed outside said successive layers of said sandwich board to provide greater protection to said successive layers from environmental conditions, said protective multi-layer film comprising:
      (iii) an outer acrylic film which faces away from said successive layers of said sandwich board;
      (ii) an inner absorbent cellulose film affixed to an outer layer of said successive layers of said sandwich board, said inner absorbent cellulose film impregnated with a resin which is compatible with a resin used to impregnate the outer layer of said successive layers of said sandwich board; and
      (iv) an adhesive layer which adheres said outer acrylic film to said inner absorbent cellulose film of said multi-layer film.

2. The sandwich board of claim 1 wherein the successive layers comprise:
   a core comprised of packages of absorbent cellulose sheets impregnated with phenolic resin;
   a cellulose film impregnated with melamine outside said core;
   a wood panel treated with phenolic resin outside said cellulose film;
   a tone package of one to three translucent and/or transparent films of cellulose each of which is impregnated with a resin selected from the group consisting of melamine, melamine-acrylic, phenolic and melamine-phenolic; and
wherein a demoulding film is placed over the multi-layer transparent/translucent film during the board press process.

3. The sandwich board of claim 2 wherein said demoulding film is selected from the group consisting of matte silicone, polypropylene and gloss silicone.

4. The improved sandwich board of claim 2 wherein one of said tone package films has a silica-extender.

5. The improved sandwich board of claim 2 wherein one of said tone package films has a pigment-extender.

* * * * *